(12) United States Patent
Nobayashi et al.

(10) Patent No.: US 11,277,569 B2
(45) Date of Patent: Mar. 15, 2022

(54) MEASUREMENT APPARATUS, IMAGE CAPTURING APPARATUS, CONTROL METHOD, AND RECORDING MEDIUM

(71) Applicant: CANON KABUSHIKI KAISHA, Tokyo (JP)

(72) Inventors: Kazuya Nobayashi, Tokyo (JP); Akinari Takagi, Yokosuka (JP); Takashi Sasaki, Yokohama (JP); Asahi Suzuki, Yokohama (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/880,731

(22) Filed: May 21, 2020

(65) Prior Publication Data
US 2020/0374468 A1 Nov. 26, 2020

(30) Foreign Application Priority Data
May 24, 2019 (JP) .............................. JP2019-097939

(51) Int. Cl.
*H04N 5/232* (2006.01)
*G01C 3/08* (2006.01)

(52) U.S. Cl.
CPC ....... *H04N 5/232939* (2018.08); *G01C 3/085* (2013.01); *H04N 5/23222* (2013.01)

(58) Field of Classification Search
None
See application file for complete search history.

(56) References Cited

U.S. PATENT DOCUMENTS

2013/0335559 A1* 12/2013 Van Toorenburg ...... G01C 3/02
348/135
2015/0116315 A1* 4/2015 Takemoto ............. G06T 19/006
345/419
2017/0326739 A1* 11/2017 Nakazato ............... B25J 9/1612

FOREIGN PATENT DOCUMENTS

JP 2011-232330 A 11/2011

* cited by examiner

*Primary Examiner* — Clifford Hilaire
(74) *Attorney, Agent, or Firm* — Cowan, Liebowitz & Latman, P.C.

(57) ABSTRACT

A measurement apparatus operable to perform measurement concerning a predetermined item for a target subject which is a measurement target. The apparatus comprises an acquisition unit configured to, for a captured image acquired by capturing of an image capturing range that includes the target subject, acquire distance information indicating a distribution of a subject distance from an image capturing apparatus that performed the capturing and, at least, normal line information that indicates a normal line of a surface of the target subject; and a presentation unit configured to present a notification that indicates an image capturing direction of the image capturing apparatus for performing measurement of the predetermined item based on the normal line information acquired by the acquisition unit.

18 Claims, 7 Drawing Sheets

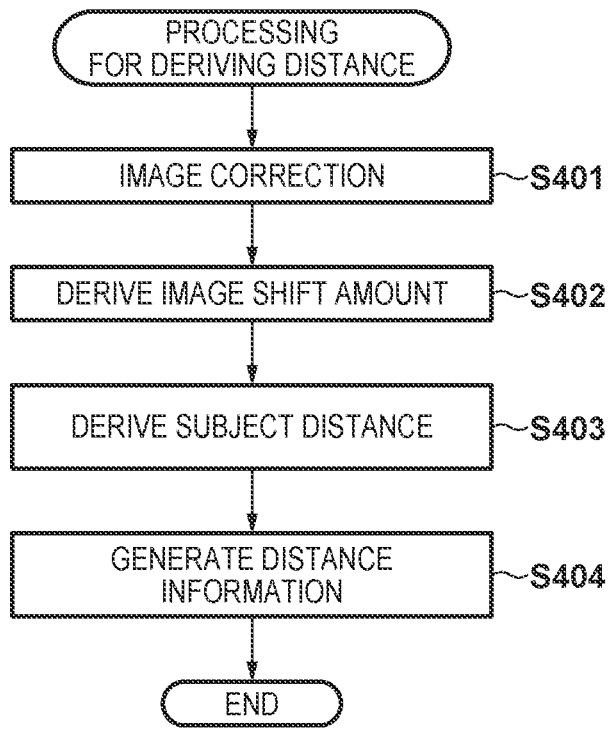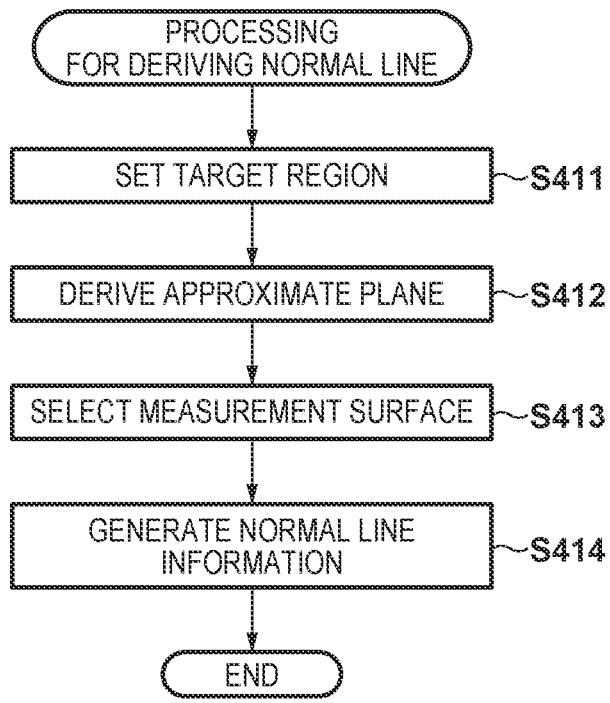

MEASUREMENT APPARATUS, IMAGE CAPTURING APPARATUS, CONTROL METHOD, AND RECORDING MEDIUM

BACKGROUND OF THE INVENTION

Field of the Invention

The present invention relates to a measurement apparatus, an image capturing apparatus, a control method, and a recording medium, and more particularly relates to a measurement technique based on a captured image of a target object within an image capturing range in which image capturing is performed.

Description of the Related Art

There is an image capturing apparatus capable of, regarding a subject existing in an image capturing range, acquiring a three-dimensional position of the subject at each pixel position by deriving a distance (subject distance) from the image capturing apparatus based on a group of images having a parallax relationship, and measuring a spatial distance between two designated points (Japanese Patent Laid-Open No. 2011-232330).

Incidentally, in the technique described in Japanese Patent Laid-Open No. 2011-232330, a reduction in measurement accuracy can occur depending on the positional relationship between the image capturing apparatus and the two points which are to be measurement targets. For example, when a so-called perspective representation is used as a composition for capturing a measurement target, there is a possibility that a difference may occur in the positional relationship in the depth direction between two points set as measurement targets in the image capturing range, and a suitable system measurement result will not be possible to acquire. This is because, when capturing a subject which is the measurement target is performed, the further away the subject the lower the spatial resolution appears in the image, and therefore, even if two points having different depth directions are measured as measurement targets based on the image, an error may occur in a measurement result.

SUMMARY OF THE INVENTION

The present invention has been made in view of the above-mentioned problems, and an object thereof is to provide a measurement apparatus, an image capturing apparatus, a control method, and a recording medium for presenting to a user an image capturing direction in which a measurement result with suitable accuracy can be acquired.

The present invention in its first aspect provides a measurement apparatus operable to perform measurement concerning a predetermined item for a target subject which is a measurement target, the apparatus comprising: at least one processor; and a memory storing instructions that, when executed by the at least one processor, cause the at least one processor to function as: an acquisition unit configured to, for a captured image acquired by capturing of an image capturing range that includes the target subject, acquire distance information indicating a distribution of a subject distance from an image capturing apparatus that performed the capturing and, at least, normal line information that indicates a normal line of a surface of the target subject; and a presentation unit configured to present a notification that indicates an image capturing direction of the image capturing apparatus for performing measurement of the predetermined item based on the normal line information acquired by the acquisition unit.

The present invention in its second aspect provides an image capturing apparatus operable to perform measurement concerning a predetermined item for a target subject which is a measurement target, the apparatus comprising: at least one processor; and a memory storing instructions that, when executed by the at least one processor, cause the at least one processor to function as: an image capturing unit configured to capture an image capturing range that includes the target subject from a plurality of different viewpoints and output a pair of captured images; a generation unit configured to, based on the pair of captured images, generate, with respect to a subject in the image capturing range, distance information indicating a distribution of a subject distance from the image capturing apparatus, and normal line information indicating at least a normal line of a surface of the target subject; and a presentation unit configured to present a notification that indicates an image capturing direction of the image capturing apparatus for performing measurement of the predetermined item based on the normal line information generated by the generation unit.

The present invention in its third aspect provides a control method of a measurement apparatus operable to perform measurement concerning a predetermined item for a target subject which is a measurement target, the method comprising: for a captured image acquired by capturing of an image capturing range that includes the target subject, acquiring distance information indicating a distribution of a subject distance from an image capturing apparatus that performed the capturing and, at least, normal line information that indicates a normal line of a surface of the target subject; and presenting a notification that indicates an image capturing direction of the image capturing apparatus for performing measurement of the predetermined item based on the acquired normal line information.

Further features of the present invention will become apparent from the following description of exemplary embodiments (with reference to the attached drawings).

BRIEF DESCRIPTION OF THE DRAWINGS

FIGS. 4A and 4B are flow charts illustrating a distance derivation process and a normal line derivation process according to an embodiment and a modification of the present invention.

DESCRIPTION OF THE EMBODIMENTS

Figure 1:
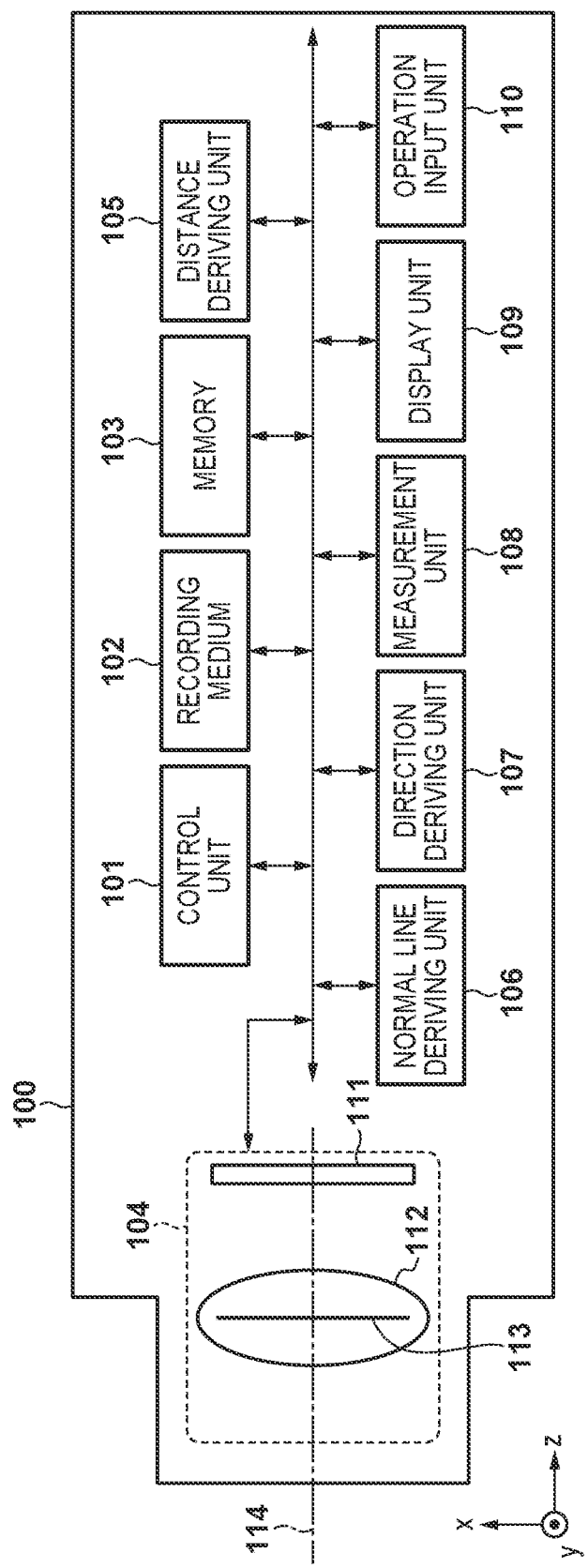
FIG. 1 is a block diagram showing a functional configuration of a digital camera 100 according to an embodiment and a modification of the present invention.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

In the embodiment described below, an example in which the present invention is applied to a digital camera capable of deriving a subject distance based on a pair of image capturing images having a parallax relationship as an example of a measurement apparatus will be described. However, the present invention can be applied to any device configured to be able to derive a normal line of a surface of a subject included in an image capturing range.

<Configuration of Digital Camera 100>

FIG. 1 is a block diagram showing a functional configuration of a digital camera 100 according to an embodiment of the present invention.

A system control unit 101 is a control apparatus, such as a microcomputer, for controlling each block included in the digital camera 100. The system control unit 101 reads out an operation program for each block included in the digital camera 100 from a recording medium 102, deploys the program to a memory 103, and executes the program to thereby control the operation of each block included in the digital camera 100.

The recording medium 102 is, for example, a rewritable nonvolatile memory such as a flash ROM. The recording medium 102 stores, in addition to the operation program of each block included in the digital camera 100, parameters and the like necessary for the operation of each block. In contrast, the memory 103 is a rewritable volatile memory. The memory 103 is used not only as a deployment region for the operation program of each block included in the digital camera 100, but also as a temporary storage region for intermediate data output in the accordance with the operation of respective blocks.

An image capturing unit 104 captures a subject included in an image capturing range, and outputs image data of a captured image. In the present embodiment, the image capturing unit 104 is configured by including at least an image capturing element 111 and an image capturing optical system 112. The image capturing optical system 112 forms a subject image on the image capturing element 111. The image capturing optical system 112 includes, for example, a fixed lens, a variable magnification lens for changing a focal length, a focus lens for performing focus adjustment, and the like. The image capturing optical system 112 also includes a diaphragm, and an aperture diameter of the optical system is adjusted in accordance with the diaphragm to adjust the amount of light at a time of capturing.

The image capturing element 111 is a photoelectric conversion element such as a charge-coupled device (CCD) or a complementary metal-oxide semiconductor (CMOS) sensor. The image capturing element 111 photoelectrically converts an optical image formed on an image capturing surface in accordance with the image capturing optical system 112 to obtain an analog image signal. The image capturing unit 104 applies A/D conversion processing to the obtained analog image signal to obtain digital image data (referred to simply as a captured image below). The image capturing unit 104 outputs the obtained image data to the memory 103 to cause the memory 103 to store the obtained image data.

In the present embodiment, the image capturing unit 104 is described as simply applying A/D conversion processing and then outputting a captured image, but may be configured to perform other image processing in order to enable the captured image to be suitably used in various types of processing. The image capturing unit 104 may perform image processing such as white balance adjustment, color interpolation, reduction/enlargement processing, and the like, for example.

<Configuration of Image Capturing Element 111>

In addition, in the present embodiment, the image capturing element 111 is configured to be capable of capturing a pair of captured images having a parallax relationship so as to enable derivation of a surface normal line of a subject based on a distance between the subject and a main point of the image capturing optical system 112 (a subject distance) and the distribution of the subject distance. Hereinafter, details will be described with reference to FIGS. 2A to 2C.

Figure 2A:
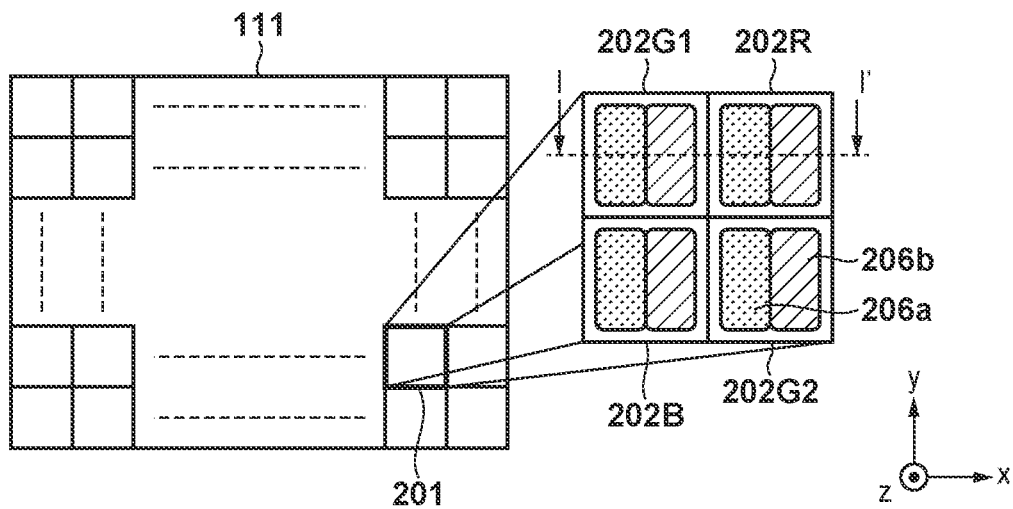
FIGS. 2A, 2B and 2C are diagrams for describing a configuration of an image capturing element 111 according to an embodiment and a modification of the present invention.

As shown in FIG. 2A, the image capturing element 111 has a two-dimensionally arranged pixel structure arranged perpendicular to an optical axis 114 of the image capturing optical system 112. More specifically, the image capturing element 111 is configured by a so-called Bayer arrangement, where a pixel group 201 of two rows×two columns is taken as one unit and the image capturing element 111 is configured by pixel groups being arranged two-dimensionally. In the four pixels included in the pixel group 201, a color filter is applied, and pixels 202G1 and G2 for detecting the amount of light of the green wavelength component are arranged in a diagonal direction. For the remaining two pixels, a pixel 202R for detecting the amount of light of a red wavelength component and a pixel 202B for detecting the amount of light of a blue wavelength component are arranged.

Figure 2B:
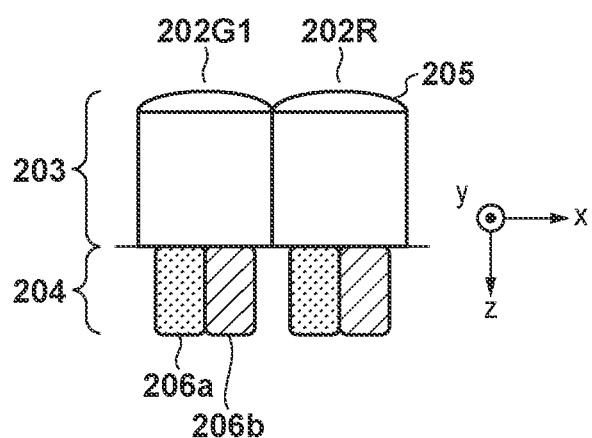

In order to capture the above-mentioned pair of captured images, a photoelectric conversion element provided for each pixel has a configuration as shown in FIG. 2B. FIG. 2B is a diagram exemplifying pixel structures in a I-I' cross-section shown for one pixel group 201 in FIG. 2A. As illustrated, each of the pixel 202G1 and the pixel 202R is configured by having a light receiving layer 203 and a light guiding layer 204, where luminous flux incident through a microlens 205 is photoelectrically converted by the light receiving layer 203. Here, the light receiving layer 203 of each pixel is provided with two photoelectric conversion elements 206a and 206b that photoelectrically convert the received light, and, from among incident luminous flux, photoelectrically convert luminous flux that has passed through respectively different regions of the exit pupil 113 of the image capturing optical system 112. That is, with such a configuration, the image capturing element 111 of the present embodiment is capable of capturing in which the incident luminous flux is pupil-divided, and it is possible to acquire a pair of captured images by combining the outputs from photoelectric conversion elements 206 of all the pixels that are on the same side (a or b).

Figure 2C:
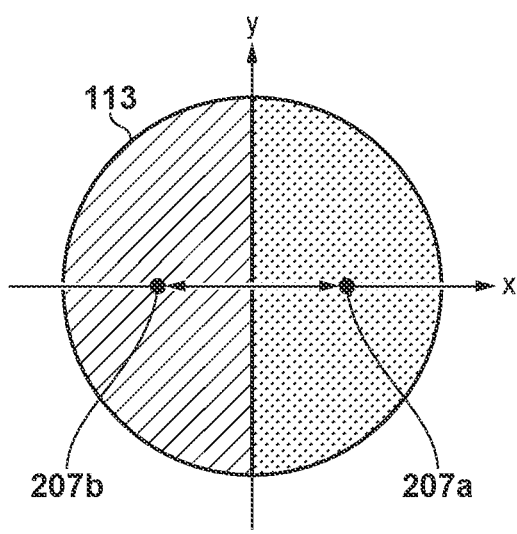

More specifically, the photoelectric conversion element 206 of one pixel and the exit pupil 113 of the image capturing optical system 112 are optically conjugate with each other through the microlens 205. With such a configuration, the luminous flux incident on each pixel is received by each of the photoelectric conversion elements 206a and 206b by the microlens 205, whereby pupil division is realized, and a captured image group (a pair of captured images) for incident luminous flux from two kinds of directions is acquired by one round of capturing. In other words, of the luminous flux passing through the exit pupil 113 of the image capturing optical system 112, the luminous flux indicated by dots in FIG. 2C is received by the photoelectric conversion element 206a, and the luminous flux indicated by hatching is received by the photoelectric conversion element 206b. Here, FIG. 2C shows the exit pupil 113 of the image capturing optical system 112 as viewed from an intersection point (center image height) between the optical axis 114 and the image capturing element 111. That is, the pair of captured images is equivalent to those captured by an image capturing apparatus group for different viewpoints, in which a distance formed between a center of gravity position 207a in the exit pupil 113 of the luminous flux received by the photoelectric conversion element 206a and a matching center of gravity position 207b for the photoelectric conversion element 206b is a base line length.

In the present embodiment, description is given assuming that the photoelectric conversion element 206 is configured to perform pupil division of an x-axis direction of the image capturing element 111 as illustrated, but implementation of the present invention is not limited thereto. That is, the pupil division direction may be determined in the y-axis direction, or may be determined for two axes, the x-axis and the y-axis, with four photoelectric conversion elements 206 configured, and may be divided in any direction and number.

A distance deriving unit 105 derives a subject distance for a subject in the image capturing range based on a captured image acquired by the image capturing unit 104. As described above, a pair of captured images acquired by the image capturing unit 104 of the present embodiment are in a relationship in which they have parallax, and the distance deriving unit 105 can derive a defocus amount based on a relative image shift amount between the images, and derive a subject distance based on the defocus amount and an image capturing condition. For example, for each pixel of one captured image, the distance deriving unit 105 derives a distance to a subject existing in the pixel, and configures distance information indicating a two-dimensional distribution of the subject distance.

Based on the distance information acquired by the distance deriving unit 105, a normal line deriving unit 106, for example, derives, for a subject that is a measurement target (a target subject), a normal line of a surface that constitutes the subject. As will be described in detail later the digital camera 100 of the present embodiment is configured to, with respect to a target subject out of subjects in the image capturing range, be able to measure, for example, a distance between two points set for the subject, an outer circumferential distance of a specific portion (a surface of the target subject), an area of a region set on the subject, and the like. Since measurement is performed based on the captured image, description is given with the normal line deriving unit 106 deriving a normal line based on distance information acquired by passive stereo method from the pair of captured images in the present embodiment, but implementation of the present invention is not limited to this. That is, this method effectively uses the distance information used for the measurement so as to realize an apparatus configuration with a minimum configuration, and it goes without saying that another method may be adopted for the method of deriving the normal line.

A direction deriving unit 107 derives an image capturing direction in which it is preferable to perform image capturing on the target subject in order to improve the measurement accuracy of the measurement described above. That is, in image capturing with a composition in which a target subject extends in the depth direction in the image capturing range, the spatial resolution of the subject image appearing in the captured image changes, and therefore the measurement accuracy may be lowered. For this reason, in the digital camera 100 of the present embodiment, the direction deriving unit 107 derives an image capturing direction in which image capturing suitable for measurement is possible based on the information of the normal line of the target subject derived by the normal line deriving unit 106.

Based on distance information acquired with respect to a suitable image capturing direction, a measurement unit 108 performs measurement of items determined to be measured with respect to a target subject.

A display unit 109 is a display apparatus such as an LCD, for example, and presents various types of information in the digital camera 100. The display unit 109 functions as a digital viewfinder by displaying (through display) A/D-converted image data when an image is being captured by the image capturing unit 104. In the present embodiment, the display unit 109 is also used to display a GUI when making a notification of a suitable image capturing direction or displaying a measurement result.

An operation input unit 110 is a user input interface included in the digital camera 100, such as a release switch, a setting button, or a mode setting dial. Upon detecting an operation input made to various user input interfaces, the operation input unit 110 outputs a control signal corresponding to the operation input to the system control unit 101. In an aspect in which the display unit 109 includes a touch panel sensor, the operation input unit 110 also functions as an interface for detecting a touch operation performed with respect to the display unit 109.

In the present embodiment, description is given assuming that processing is realized by a circuit or a processor corresponding to each block included in the digital video camera 100 as hardware. However, implementation of the present invention is not limited to this, and the processing of each block may be realized by a recording medium for performance of the same processing as that of each block.

<Measurement Processing>

Figure 3:
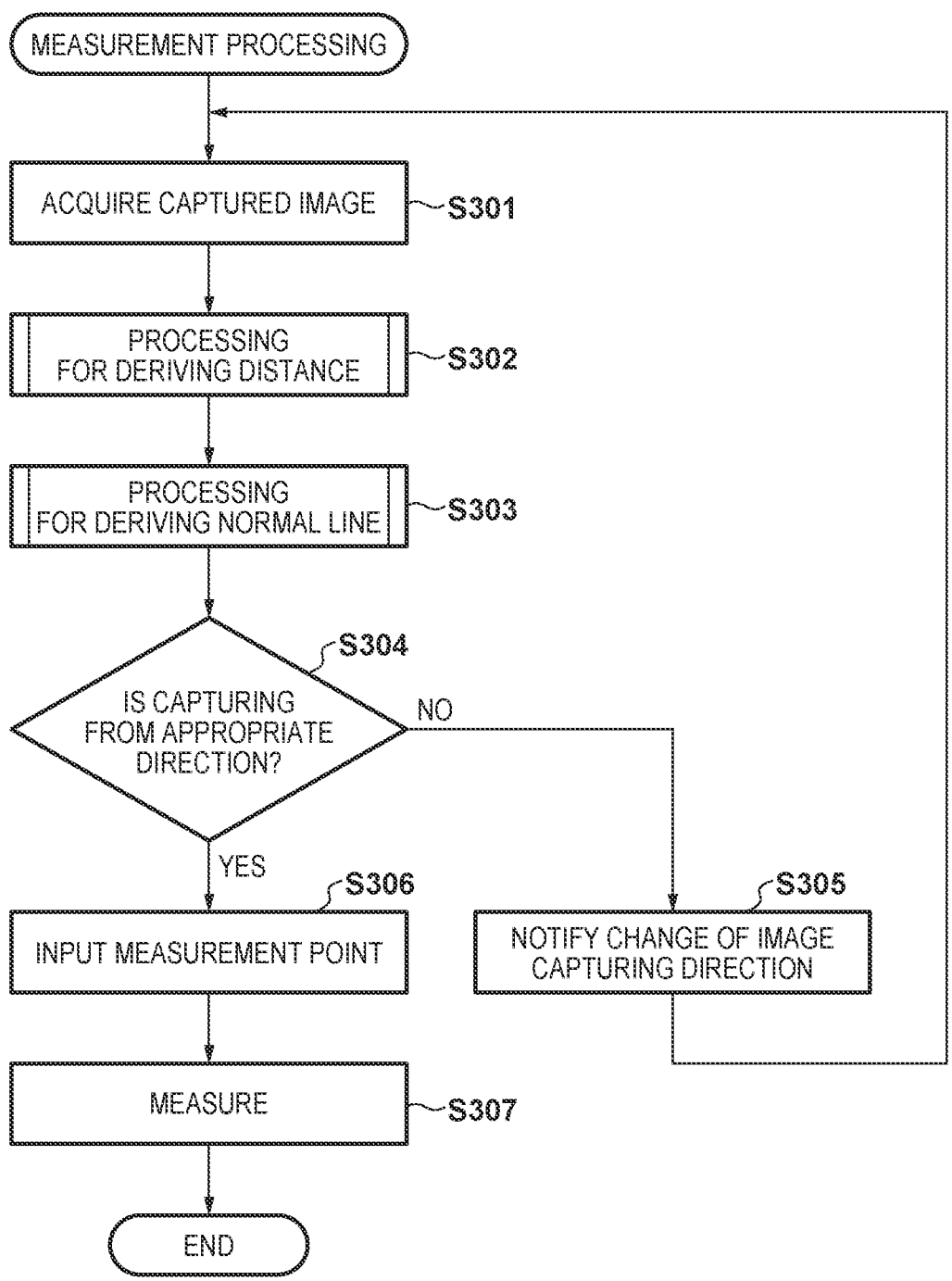
FIG. 3 is a flowchart illustrating measurement processing executed by the digital camera 100 according to an embodiment of the present invention.

In the digital camera 100 of the present embodiment having this kind of configuration, regarding measurement processing for measuring a relevant item of the target subject based on the distance information acquired from the pair of captured images, description is given in detail for the processing with reference to the flow chart of FIG. 3. The processing corresponding to the flow chart can be realized by, for example, the system control unit 101 reading out a corresponding processing recording medium stored in the recording medium 102, deploying it to the memory 103, and executing it. The measurement processing will be described as being started when, for example, a measurement mode for performing image-based measurement of a target subject is set in the digital camera 100. In the following description, to facilitate understanding of the present invention, a measurement item is assumed to be something for which dimensions between two points set for the target subject are measured.

In step S301, the image capturing unit 104, under the control of the system control unit 101, captures an image capturing range. Upon acquiring a pair of captured images by image capturing, the image capturing unit 104 stores the pair of captured images in the memory 103. The processing of this step may be performed in response to detection of an operation input relating to an image capturing instruction, or may be performed without an operation input after performing predetermined processing such as focus detection and focus adjustment that is performed before capturing.

In step S302, the distance deriving unit 105, under the control of the system control unit 101, derives a subject distance of the image capturing range based on the pair of captured images acquired in step S301, and executes distance deriving processing to configure distance information.

<Distance Derivation Processing>

Here, the distance deriving processing of this step will be described in detail with reference to the flow chart of FIG. 4A.

In step S401, the distance deriving unit 105 performs various correction processes prior to the distance derivation on the pair of image capturing images used for deriving the subject distance. More specifically, the distance deriving unit 105 performs correction for reducing deviation of the amount of received light between the photoelectric conversion elements 206a and 206b due to vignetting of the image capturing optical system 112 or the like. The distance deriving unit 105 further applies a band-pass filter to reduce the influence of noise included in the pair of image capturing images.

In step S402, the distance deriving unit 105 derives image shift amounts for the subjects of the respective pixels based on the pair of captured images. First, the distance deriving unit 105 sets a pixel of interest and a base region centered on the pixel of interest for one image (A image) of the pair of captured images. Then, the distance deriving unit 105 sequentially sets a reference pixel and a reference region centered on the reference pixel for the other image (B image), and, while deriving a correlation value between the images of the base region and the reference region, specifies the position of a reference pixel having the highest correlation. As the correlation value, a known method can be used, and for example, it is possible to use an evaluation value called sum of squared differences (SSD) to evaluate the sum of squares of the difference between the pixel value in the base region and the pixel value in the reference region. In SSD, the degree of difference is evaluated, and the smaller the value of the evaluation value, the higher the degree of correlation. The setting of the reference pixel and the reference region may be performed while causing sequential movement in the x direction, which is the pupil division direction, whereby the distance deriving unit 105 specifies where in the B image the subject corresponding to the pixel of interest of the A image is captured, and derives the image shift amount between the A image and the B image.

In step S403, the distance deriving unit 105 derives the subject distance of the subject based on the image shift amounts of the subjects of the pixels derived in step S402. Here, the derivation of the subject distance from the image shift amount may be performed by using an existing method. For example, since the image shift amount can be converted into the defocus amount of the subject based on a geometric relationship using the base line length, it is possible to derive the subject distance by using the defocus amount and an image forming relationship of the image capturing optical system 112.

In step S404, the distance deriving unit 105 configures the information of the subject distance derived for the respective pixels as two-dimensional information, generates distance information, and stores the distance information in the memory 103. Upon the distance deriving unit 105 generating the distance information by executing the distance deriving processing in this manner, the system control unit 101 shifts the processing to step S303.

In step S303, the normal line deriving unit 106, under the control of the system control unit 101, executes a normal line deriving process for deriving normal line information indicating a surface normal line of a target subject using the distance information generated in step S302.

<Normal Line Deriving Process>

Here, the normal line deriving processing of this step will be described in detail with reference to the flow chart of FIG. 4B.

In step S411, the normal line deriving unit 106 sets a region in which the image of the target subject, which is the derivation target of the surface normal line, exists (a target region). For the sake of simplicity in the present embodiment, it is envisioned that the target subject that the user desires to measure is arranged in the vicinity of the center of the angle of view, and it is assumed the normal line deriving unit 106 sets a region of a predetermined size existing at the center of the angle of view as the target region.

In the present embodiment, description is given assuming that a subject disposed in the vicinity of the center of the angle of view is set as the target region in which the image of the target subject exists, but implementation of the present invention is not limited to this. The setting of the target region may be performed based on a touch operation input such as tracing or the like performed in a state in which a captured image is displayed on the display unit 109, or an operation input for designating another region, and an arbitrary region may be selectable as the target region.

In step S412, the normal line deriving unit 106 derives a plane approximating a surface formed by the subject existing in the target region. The normal line deriving unit 106 randomly samples (or refers to all) the pixels included in the target region, and derives the three-dimensional coordinates of the target subject existing in these pixels based on the distance information.

Figure 5:
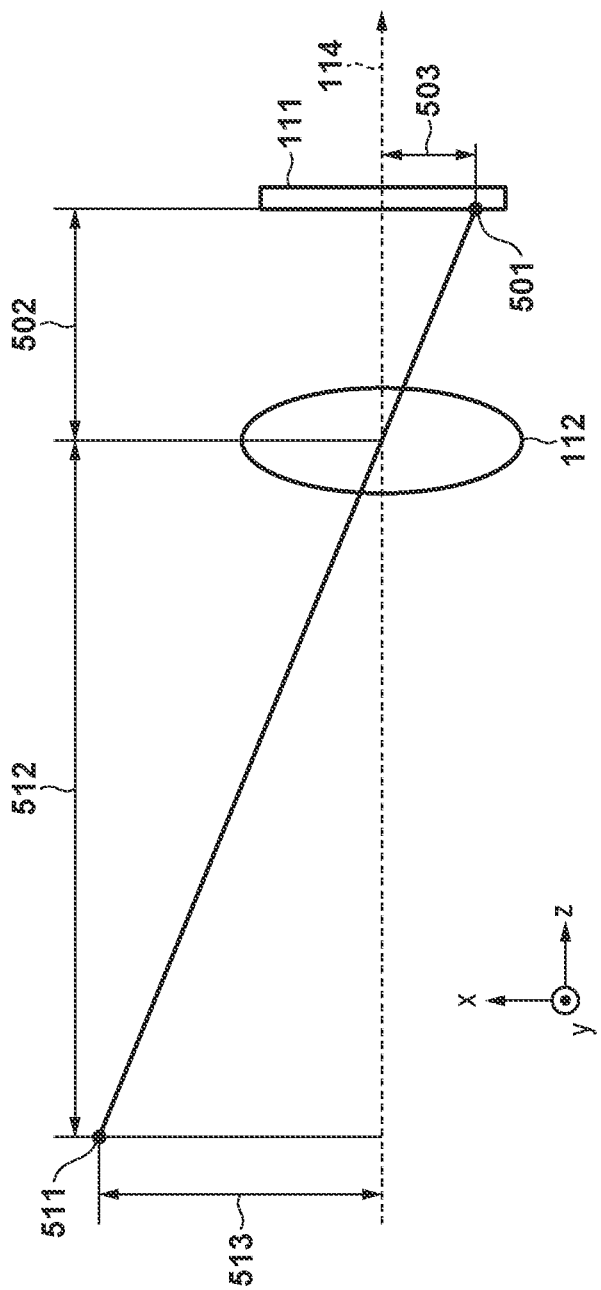
FIG. 5 is a diagram for describing an image forming relationship of an image capturing optical system 112 according to an embodiment and a modification of the present invention.

Here, the derivation of the three-dimensional coordinates based on the distance information is performed by considering the image forming relationship shown in FIG. 5 that goes through the image capturing optical system 112. For example, it is assumed that a subject image of a point 511 of the target subject is formed at a point 501 on the image capturing element 111. At this time, the subject distance stored in the distance information for the pixel related to the point 501 indicates a distance 512 from the main point of the image capturing optical system 112 to the point 511. A distance 502 from the main point of the image capturing optical system 112 to the image capturing surface of the image capturing element 111 is known from an image capturing setting. As a result, an x-coordinate (distance 513 from the optical axis 114 in the x-axis direction) of the target subject for the point 511 can be, based on the image forming relationship expression, derived by using the distance 503 from the image capturing element 111 at which the image of the optical center is formed to the point 501, and a ratio between the distance 502 and the distance 512. Since the y-axis direction can be derived in the same manner, as a result, the three-dimensional coordinates of an appropriate point for the target subject can be derived in a coordinate system where the main point of the image capturing optical system 112 is the origin.

Then, the normal line deriving unit 106 derives planes approximating a distribution of the derived three-dimensional coordinates in accordance with the least squares method. More specifically, the normal line deriving unit 106 derives least-squares planes of the three-dimensional coordinate group of the points distributed on the target subject, which is derived for the pixels of the target region, as approximate planes of the subject existing in the target region. The normal line deriving unit 106 stores information of parameters necessary for defining the derived approximate planes in the memory 103.

In step S413, from the approximate planes derived in step S412, the normal line deriving unit 106 selects, as a measurement surface of the target subject, a region which includes a point whose spatial distance from a point of the target subject is smaller than a predetermined threshold, and which is continuous from the point.

In step S414, the normal line deriving unit 106 derives the normal line of the measurement surface selected in step S413, and stores it as normal line information in the memory 103. Since the approximate planes derived in step S412 can be represented by a plane equation (ax+by+cz+d=0), the normal line deriving unit 106 can derive the normal line of the measurement surface based on the coefficients of the equation. Upon the normal line deriving unit 106 storing the normal line information by executing the normal line deriving processing in this manner, the system control unit 101 moves the processing to step S304.

In step S304, the direction deriving unit 107, under the control of the system control unit 101, determines whether or not the image capturing is performed from a direction appropriate for the measurement of the target subject based on the normal line of the measurement surface derived in step S303. Here, the direction appropriate for the measurement of the target subject is a direction in which the digital camera 100 is directly facing the measurement surface, that is, a direction in which image capturing is performed in a state in which points on the measurement surface are uniformly distributed in the vicinity of the subject distance. Therefore, the determination of this step is performed according to whether or not the angle formed by the normal line of the measurement surface derived in step S303 and the optical axis 114 is smaller than a predetermined angle for determining that the normal line and the optical axis 114 are equivalent. The direction deriving unit 107 shifts the processing to step S306 when it is determined that the image capturing is performed from a direction appropriate for the measurement of the target subject. Further, when it is determined that the image capturing is not being performed from an appropriate direction for measuring the target subject, the direction deriving unit 107 stores information of the appropriate direction or information of an orientation change of the digital camera 100 for achieving the appropriate direction in the memory 103, and shifts the processing to step S305.

In step S305, the system control unit 101 configures a notification for guiding a change in the image capturing direction to be an appropriate direction for the measurement of the target subject, transmits the notification to the display unit 109 and causes it to present the notification superimposed on the captured image. As described above, the direction appropriate for the measurement of the target subject is a direction at which the angle formed between the normal line of the measurement surface and the optical axis becomes small. In this step, in order to have the display unit 109 prompt movement or a change in orientation of the digital camera 100, guidance may be given by notification of a display mode as shown in FIG. 6.

Figure 6A:
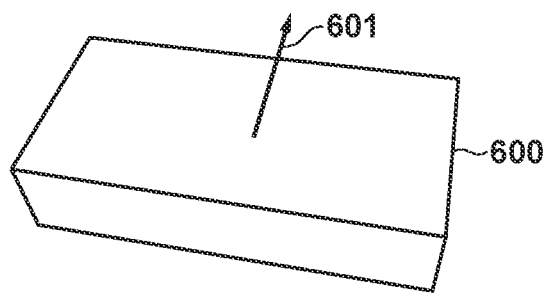
FIGS. 6A, 6B, 6C and 6D are diagrams exemplifying a mode of notifying an image capturing direction appropriate for measurement of a target subject in the digital camera 100 according to the embodiment of the present invention.
Figure 6B:
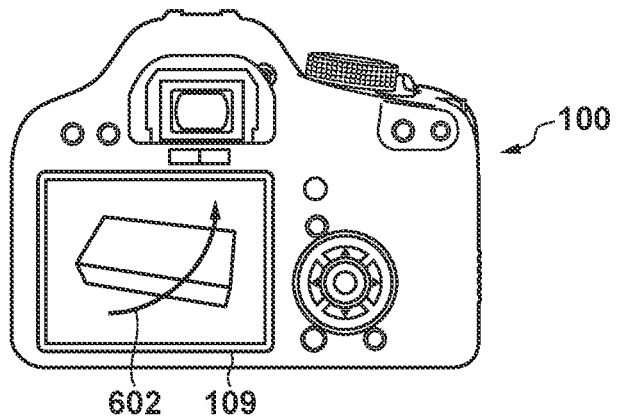
Figure 6C:
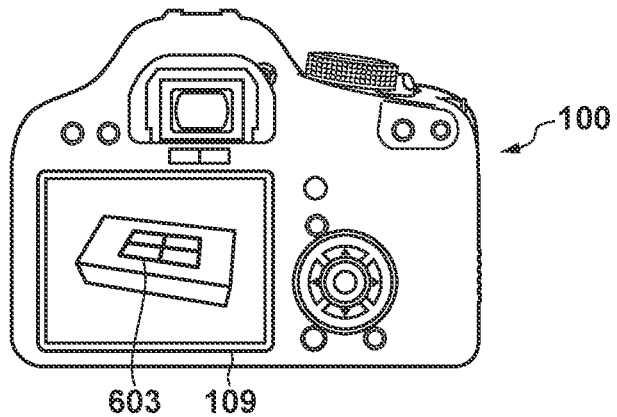
Figure 6D:
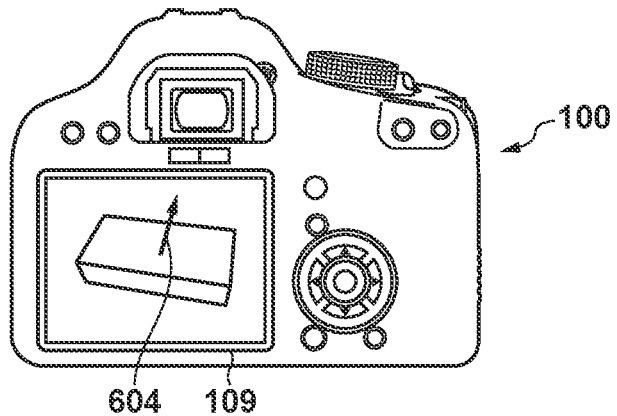

Here, in the captured image, the display mode of the above notification will be exemplified with respect to a state in which a target subject 600 is captured in a state where it does not directly face the digital camera 100 as shown in FIG. 6A, and a normal line 601 of the measurement surface does not face the direction of the optical axis 114. As shown in FIG. 6B, the notification may be a mode in which a movement direction 602 of the digital camera 100 is superimposed on the captured image and presented in order to set the image capturing direction of the digital camera 100 to a direction appropriate for measurement of the target subject 600. As shown in FIG. 6C, the notification may be a form in which a grid 603 that indicates an inclination state of the measurement surface of the target subject and changes in accordance with inclination is presented in a superimposed manner. At this time, the grid 603 is a GUI showing the measurement surface three-dimensionally, since the closer to a directly opposite state the more the display is in a rectangular shape, the user can understood, in accordance with distortion of the grid 603, whether they are directly opposite and a movement direction for causing the camera to be directly opposite. As shown in FIG. 6D, a different notification may be presented by superimposing the normal line 601 itself on the measurement surface in the form of a three-dimensional vector.

Note that, for the captured image to be superimposed, either of the pair of captured images acquired in step S301 may be used. Alternatively, an image generated by combining a pair of captured images, that is, an image equivalent to one captured in a state in which pupil division is not performed by summing the outputs of the photoelectric conversion elements 206a and 206b in each pixel may be used.

Further, in FIG. 6, modes in which a captured image on which a predetermined notification is superimposed is simply displayed have been described, but implementation of the present invention is not limited thereto. In order to more clearly notify a user that the image capturing situation is in a state where the target subject is not being captured from an appropriate direction for measurement, configuration may be taken to make the display mode for a degree of deviation differ from the appropriate direction, by the color or thickness of these GUIs or the like.

After performing such presentation, the system control unit 101, and after the image capturing direction has been changed and an operation input according to an image capturing instruction is made again, the process returns to step S301.

Figure 7:
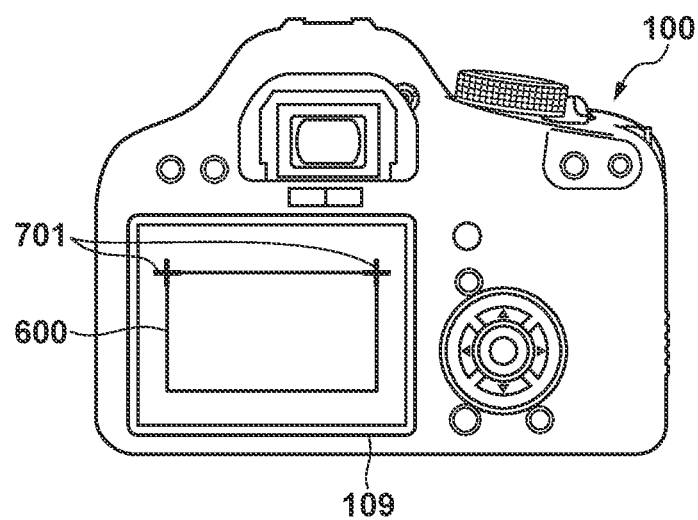
FIG. 7 is a diagram exemplifying a mode of presenting a measurement point for measurement of a target subject in the digital camera 100 according to the embodiment of the present invention.

On the other hand, if it is determined in step S304 that capturing is being performed from an appropriate direction for the measurement of the target subject, the system control unit 101, in step S306, holds the captured image in a state of being caused to be displayed on the display unit 109. Then, the system control unit 101 accepts an operation input for an instruction of two measurement points which are targets for measuring dimensions on the surface of the target subject. The operation input may be performed based on, for example, a touch operation on the display unit 109. The system control unit 101, upon determining that the instruction of the two measurement points has been made, stores the information of the measurement points in the memory 103, and moves the processing to step S307. At this time, when the measurement points are instructed, the system control unit 101 may control a screen transition of the display unit 109 so as to display an image in which the measurement point 701 is superimposed on the captured image, as shown in FIG. 7.

In step S307, the measurement unit 108 under the control of the system control unit 101, for the two measurement points instructed in step S306, measures the dimension between the two points (length). More specifically, the measurement unit 108 may measure the dimension (spatial distance) between the two measurement points based on the distance to the measurement surface based on the distance information, the lateral magnification of the image capturing optical system 112, and the coordinates of each measurement point in the captured image. Alternatively, the measurement unit 108 may first derive the three-dimensional coordinates of each measurement point based on the distance information, and measure the dimensions between the two measurement points based on the coordinate values. Then, the measurement unit 108 stores the information of the dimensions acquired by the measurement in the memory 103 as the measurement result, and completes the measurement processing.

In this way, when the measurement based on the captured image is performed on the target subject, it is possible to configure so that the measurement is performed in a suitable state while avoiding a state in which the measurement surface is not directly opposite and the measurement accuracy could be reduced.

Note that, in the normal line deriving process of the present embodiment, description was given assuming that the approximate plane is simply derived based on the three-dimensional coordinate distributions of the subject included in the target region in step S412, but implementation of the present invention is not limited to this. That is, based on the fact that a plurality of surfaces may exist in the target region, configuration may be taken to, from out of this plurality of surfaces, derive an appropriate approximate plane based only on a subject which is to be a measurement target. More specifically, the normal line deriving unit 106 may be configured such that, after plane approximation is performed, among the pixels included in the target region, a pixel in which the approximate plane and the subject distance deviate from each other in excess of a predetermined range is excluded from the target region, and the approximate plane is derived again for the pixels in the target region after the exclusion. Configuration may be taken such that this processing is recursively performed, and configuration may be taken such that this processing is repeatedly performed a predetermined number of times, or until the number of pixels deviating from the approximate plane by more than a predetermined range becomes equal to or less than a threshold value, for example.

In addition, configuration may be taken to divide the target region into a plurality of small regions, and, by classifying these in a region where the distance from the approximate plane derived in step S412 is greater than a predetermined value and a smaller region, the target region is divided into a plurality of classified small regions. In this case, the measurement surface may be selected by the user from the small regions.

In the present embodiment, description is given assuming that the notification of the direction appropriate for the measurement of the target subject and the presentation of the measurement result is performed using the display unit 109, but the manner of notifying the user of these pieces of information is not necessarily limited to the display of information on the display unit 109.

Further, in the present embodiment, in step S304 of the measurement process, description is given assuming that the notification related to the change of the image capturing direction is performed only when it is determined that the image capturing is not being performed from an appropriate direction for the measurement of the target subject, but implementation of the present invention is not limited to this. The notification indicating the current image capturing direction of the digital camera 100 may be made regardless of whether or not a change in measurement is necessary. That is, when the image capturing is performed from a direction appropriate for the measurement, a notification that the image capturing direction does not need to be changed may be performed.

In addition, in the present embodiment, a mode has been described in which configuration is such that the image capturing element 111 is capable of recording after pupil division, whereby distance information is acquired, but a mode of acquiring distance information is not limited to this. For example, a configuration may be adopted in which a pair of captured images is acquired by using a plurality of image capturing elements 111 provided in one digital camera 100 or in a plurality of digital cameras 100, instead of a configuration in which images resulting from pupil division can be recorded by one image capturing element 111. In addition, for example, configuration may be taken such that the distance information is acquired by using a Time of Flight method in which the light emitted from the light emitting unit is reflected by the target subject and the time until the light reaches the image capturing element 111 is converted into distance information using the speed of the light.

[Variation]

In the embodiment described above, description is given assuming that when it is determined that the image capturing is not performed from a direction appropriate for the measurement of the target subject, a notification for prompting a user to change the image capturing direction of the digital camera 100 is performed. On the other hand, depending on the image capturing environment, it may be difficult to move the digital camera 100 to have an appropriate image capturing direction due to an obstacle or the like existing in real space, or the derivation accuracy of the distance information may itself deteriorate due to a change in an illuminance condition.

For this reason, for example, configuration may be taken to, when a notification for guiding the change to the direction is presented in step S305 after it is determined in step S304 of the measurement process that the image capturing is not being performed from an appropriate direction for the measurement of the target subject, make measurement possible without requiring a change, in response to a predetermined input being made. More specifically, even if image capturing is performed from a direction different from a direction appropriate for measurement, if a predetermined input is made, the measurement unit 108 may generate an image of a state in which the measurement surface is directly opposite to the digital camera 100 by performing an affine transformation of the captured image, for example. The measurement unit 108 may derive the distance between the two measurement points based on the image generated by the transformation, the distance of the measurement surface in consideration of the transformation, and the lateral magnification of the image capturing optical system 112. In this way, it is possible to reduce the degree of deterioration of the measurement accuracy in a state where the measurement surface does not directly face the digital camera 100 without requiring a change of the image capturing direction.

It should be noted that configuration may be taken such that processing for performing pseudo measurement using such a transformation, instead of being performed in response to a predetermined input, is prepared in advance as a measurement mode different from a mode for performing a notification to prompt a change in the image capturing direction. The application of an affine transformation in the process of performing the pseudo measurement is not limited to a captured image, and may be applied to at least one of the captured image and the distance information, and the measurement unit 108 may perform measurement based on information after the transformation.

Other Embodiments

Embodiment(s) of the present invention can also be realized by a computer of a system or apparatus that reads out and executes computer executable instructions (e.g., one or more programs) recorded on a storage medium (which may also be referred to more fully as 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-097939, filed May 24, 2019, which is hereby incorporated by reference wherein in its entirety.

What is claimed is:

1. A measurement apparatus operable to perform measurement concerning a predetermined item for a target photographic subject which is a measurement target, the apparatus comprising:
   at least one processor; and
   a memory storing instructions that, when executed by the at least one processor, cause the at least one processor to function as:
      an acquisition unit configured to, for a captured image acquired by capturing of an image capturing range that includes the target photographic subject, acquire distance information indicating a distribution of a photographic subject distance from an image capturing apparatus that performed the capturing and, at least, normal line information that indicates a normal line of a surface of the target photographic subject;
      a determination unit configured to determine whether to perform measurement of the predetermined item based on the normal line information; and
      a presentation unit configured to cause a display unit to present a notification that indicates an image capturing direction of the image capturing apparatus for performing measurement of the predetermined item based on the normal line information acquired by the acquisition unit,
   wherein the presentation unit causes the display unit to present a notification indicating the image capturing direction of the image capturing apparatus in a case where not performing measurement of the predetermined item is determined by the determination unit.

2. The measurement apparatus according to claim 1, wherein the determination unit determines whether to perform measurement of the predetermined item based on an angle formed by the normal line of the surface of the target photographic subject and an optical axis of an image capturing optical system of the image capturing apparatus.

3. The measurement apparatus according to claim 2, wherein the determination unit determines to perform measurement of the predetermined item in a case where the angle formed by the normal line of the surface of the target photographic subject and the optical axis of the image capturing optical system of the image capturing apparatus fits within a predetermined range.

4. The measurement apparatus according to claim 1, wherein the determination unit determines that the predetermined item is to be measured in a case where the determination unit determines that a state of the image capturing apparatus when the image capturing was performed is a state where the image capturing apparatus is deemed to be directly opposite to the surface of the target photographic subject.

5. The measurement apparatus according to claim 1, wherein the notification presented by the display unit is a notification that prompts a change to an image capturing direction at which performing measurement of the predetermined item is to be determined by the determination unit.

6. The measurement apparatus according to claim 5, wherein the notification presented by the display unit includes a movement direction toward an image capturing direction at which performing measurement of the predetermined item is to be determined by the determination unit.

7. The measurement apparatus according to claim 5, wherein the notification presented by the display unit includes a display of the captured image on which at least one of a surface of the target photographic subject and a normal line of the surface is superimposed.

8. The measurement apparatus according to claim 5, wherein the notification presented by the display unit includes a degree of deviation with respect to an image capturing direction at which performing measurement of the predetermined item is to be determined by the determination unit.

9. The measurement apparatus according to claim 1, the instructions further cause the at least one processor to function as a measurement unit configured to measure the predetermined item based on the distance information acquired by the acquisition unit in a case where performing measurement of the predetermined item is determined by the determination unit.

10. The measurement apparatus according to claim 9, the instructions further cause the at least one processor to function as:

an input unit configured to accept an instruction to the effect that measurement without changing the image capturing direction of the image capturing apparatus is to be performed when the determination unit determines not to perform measurement of the predetermined item; and a conversion unit configured to, when an instruction to the effect that measurement without changing the image capturing direction of the image capturing apparatus is to be performed is accepted by the input unit, convert at least one of the captured image and the distance information into a state where performing measurement of the predetermined item is to be determined, wherein in a case where not performing measurement of the predetermined item is determined by the determination unit and an instruction to the effect that measurement without changing the image capturing direction of the image capturing apparatus is to be performed is accepted, the measurement unit performs measurement of the predetermined item based on information after the conversion by the conversion unit.

11. The measurement apparatus according to claim 1, the instructions further cause the at least one processor to function as a first configuration unit for configuring the normal line information based on the distance information, wherein the acquisition unit acquires the normal line information configured by the first configuration unit.

12. The measurement apparatus according to claim 11, wherein the first configuration unit derives an approximate plane from a distribution of a photographic subject distance of a region corresponding to the target photographic subject in the distance information, and configures the normal line information by using a normal line of the approximate plane as the normal line of the surface of the target photographic subject.

13. The measurement apparatus according to claim 1, wherein the measurement apparatus includes the image capturing apparatus, the image capturing apparatus has an output unit configured to output a pair of captured images acquired by capturing the target photographic subject from a plurality of different viewpoints, the measurement apparatus further comprises a second configuration unit configured to configure the distance information based on the pair of captured images outputted by the output unit, and the acquisition unit acquires the distance information configured by the second configuration unit.

14. The measurement apparatus according to claim 1, the instructions further cause the at least one processor to function as a selection unit configured to select the target photographic subject from among photographic subjects captured in the captured image.

15. The measurement apparatus according to claim 1, wherein the predetermined item includes at least one of dimensions between set measurement points on a surface of the target photographic subject, an outer circumferential distance of the surface, and an area of a set region on the surface.

16. A non-transitory computer-readable recording medium having recorded thereon a program for causing a computer to function as each unit of the measurement apparatus according to claim 1.

17. An image capturing apparatus operable to perform measurement concerning a predetermined item for a target photographic subject which is a measurement target, the apparatus comprising:

an image capturing unit configured to capture an image capturing range that includes the target photographic subject from a plurality of different viewpoints and output a pair of captured images;

at least one processor; and a memory storing instructions that, when executed by the at least one processor, cause the at least one processor to function as:

a generation unit configured to, based on the pair of captured images, generate, with respect to a photographic subject in the image capturing range, distance information indicating a distribution of a photographic subject distance from the image capturing apparatus, and normal line information indicating at least a normal line of a surface of the target photographic subject;

a determination unit configured to determine whether to perform measurement of the predetermined item based on the normal line information; and a presentation unit configured to cause to a display unit to present a notification that indicates an image capturing direction of the image capturing apparatus for performing measurement of the predetermined item based on the normal line information generated by the generation unit, wherein the presentation unit causes the display unit to present a notification indicating the image capturing direction of the image capturing apparatus in a case where not performing measurement of the predetermined item is determined by the determination unit.

18. A control method of a measurement apparatus operable to perform measurement concerning a predetermined item for a target photographic subject which is a measurement target, the method comprising:

for a captured image acquired by capturing of an image capturing range that includes the target photographic subject, acquiring distance information indicating a distribution of a photographic subject distance from an image capturing apparatus that performed the capturing and, at least, normal line information that indicates a normal line of a surface of the target photographic subject;

determining whether to perform measurement of the predetermined item based on the normal line information; and presenting a notification that indicates an image capturing direction of the image capturing apparatus for performing measurement of the predetermined item based on the acquired normal line information, wherein a notification indicating the image capturing direction of the image capturing apparatus is presented in a case where not performing measurement of the predetermined item is determined.

* * * * *